Nov. 27, 1945.   G. E. FREUND   2,389,617
EXPOSURE METER
Filed Oct. 9, 1944

INVENTOR.
GERTRUDE E. FREUND,
BY
ATTORNEY.

Patented Nov. 27, 1945

2,389,617

UNITED STATES PATENT OFFICE 2,389,617

EXPOSURE METER

Gertrude E. Freund, San Fernando, Calif.

Application October 9, 1944, Serial No. 557,736

9 Claims. (Cl. 88—23)

My invention relates to the photographic art and particularly to an exposure meter which is used for determining the amount of light falling upon an object to be photographed in order that a correct exposure of the photographic emulsion is attained and a satisfactory picture of desired tone and contrast may be made.

Among the objects of my invention is to provide a new and improved exposure meter which is so constructed that the operator is able to make readings of both the quantity of incident light falling upon an object and the quantity of light reflected from it.

Another object of my invention is to provide a new and improved exposure meter which is capable of measuring either incident or reflected light but which utilizes the same photo-sensitive device for each measurement.

Still another object of my invention is to provide a new and improved reversible type exposure meter which is provided with a device for collecting incident light and a second device for collecting reflected light so arranged that both of these light-collecting devices are adapted to use the same photo-electric cell but which are so set up that each is provided in turn with its own proper scale of readings, these scales becoming available automatically depending upon which way the instrument is being used so that the readings may be read directly without having to resort to an unnecessary amount of calculation.

With these and other objects in view, my invention consists in the construction, arrangement and combination of the various parts of my device whereby the objects contemplated are attained, as hereinafter more fully set forth, pointed out in my claims and illustrated in the accompanying drawing, in which:

Figure 1:
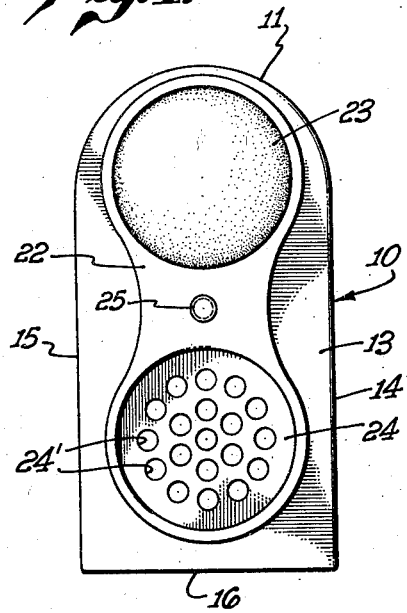
Fig. 1 is a front elevational view of the device.
Figure 2:
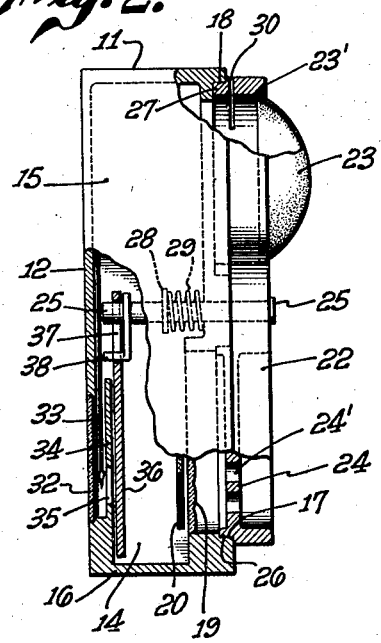
Fig. 2 is a side elevational view of the device with portions cut away in order to reveal the internal structure.
Figure 3:
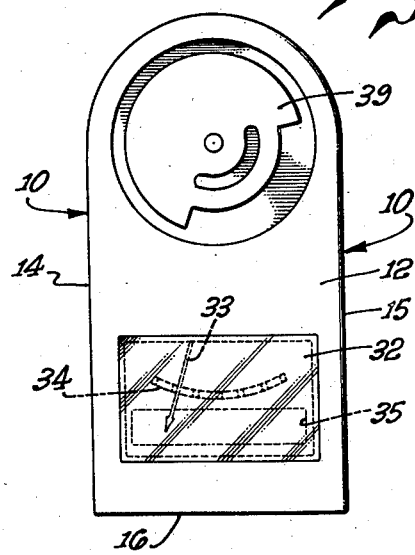
Fig. 3 is a rear elevational view of the device.
Figure 4:
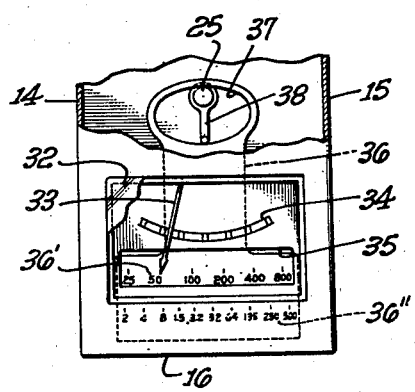
Fig. 4 is a rear view of the device with the wall of the housing partly broken away in order to reveal a means for shifting the scales.

In the photographic art it has been discovered that in order to get a proper reading of the amount of light upon an object which will affect photographic film, it is necessary to take into consideration not only the aggregate of light which is reflected from all of the surfaces to be photographed but also the correct measure of the amount of light which is actually falling upon the object. Although it is important to know the aggregate of light reflected, it has been found in practice that it is not always easy to correctly measure the true value of the reflected light, particularly from a surface which has many different light-reflecting values. The same difficulty arises when relatively large surfaces are to be photographed. What the exposure meter records is, as a rule, an average of the reflection characteristics. An average of this kind, under some circumstances, will fail to give correct values for any single surface or object within the field of view and therefore fails to give information necessary to secure the best possible negative of a selected object.

In order to give further information to the photographer it has been proposed in some instances to provide him with an exposure meter which is responsive to incident light, that is to say the amount of light which falls upon the object. A proper and desired photographic exposure of such object can then be obtained, irrespective of the light-reflective characteristics of the background or other objects.

It is often highly advantageous for the photographer to know both the values of incident light and the values of reflected light on the object to be photographed and if this is to be measured conveniently there should be provided an instrument which can measure both sets of values, or possibly one which can be quickly changed in order to read the result of one kind of light or another. An instrument of the latter kind which uses a single photo-electric apparatus becomes highly desirable because of the relatively high cost of incorporating more than one of these devices in the exposure meter.

In the invention here proposed there has been provided an instrument which is small and compact in design for housing a single photo-sensitive device but which can be adjusted with regard to the outer portion of the casing so that either type of light may be measured and recorded by the same photo-sensitive device.

In the simple form of device illustrated in the drawing, the body 10 has a rounded top 11, a rear wall 12, front wall 13, side walls 14 and 15 and bottom 16. The front wall is provided with two circular recesses 17 and 18, the lower recess providing a means for admitting light and containing a grid or lenticular member 19 and a photoelectric cell bearing a light-sensitive member 20 behind the lenticular. The photo-electric cell may be of any suitable type, the term "photoelectric cell" including photo-conductive, semiconducting or barrier-layer, photronic and other types. A suitable milliammeter, microammeter, microvoltmeter or millivoltmeter is positioned in the upper portion of the body 10 and operably connected to the photo-electric cell.

A carrier 22 illustrated carries at one end a light-collecting member 23 adapted to receive incident light and a grid or reticulated element 24 having apertures 24' adapted to receive reflected light and direct it into the photo-electric cell. The entire carrier 22 is mounted upon a shaft 25 journaled in the body 10, so as to permit either the collector 23 or the grid 24 to be selectively placed in operative relation to the photo-electric cell.

The rear face of the carrier 22 may be provided with rearwardly extending, circular lips 26 and 27 adapted to slidably fit into recesses 17 and 18 and form light-tight joints. In order to permit these lips to be withdrawn (when rotating the carrier with respect to the body 10) shaft 25 may be provided with a stop 28 and a spring 29, whereby the carrier 22 and the shaft may be moved away from the body during rotation, the spring 29 normally holding the carrier in position.

The light-collecting element 23 may be convex or plane but at all events is made of a translucent, frosted, milky or white material such as a thin cellulosic or plastic material containing white pigment, frosted glass or the like. A convex form of collecting element is desirable since it will collect light falling upon the object from various directions more readily. A recess 23' is provided into which the edge of the collecting element may be snapped to hold it properly in position.

In order to permit a sensitive milliammeter or microvoltmeter to be employed, it is desirable to modulate very strong light by means of a masking member. As shown, a slot 30 may be provided in that end of carrier 22 carrying the collector 23, this slot being adapted to slidably receive and hold a perforated disc or mask, the area of the perforations bearing a desired ratio to the total area of collector 23 so that readings on the scale of the photocell need only be multiplied by a predetermined factor when such mask is used. Such masks may also be used when the light-transmitting grid 24 is employed for reflected light of high intensity, such masks being placed over the grid 24 to reduce the area of the light-transmitting openings.

The back wall 12 of the body is preferably provided with a window 32 so as to render visible the position of index or needle 33 of the device which indicates the response of the photo-electric cell. The needle 33 may move in a space between the window 32 and a barrier 34 provided with an opening 35 through which there is visible a scale 36 having an upper index 36' and a lower index 36'' correlated one with the collector 23 and the other with the transmitting grid 24, depending upon which of these elements is in operative position above the photo-electric cell. Means are provided for automatically moving the scales into reading position with respect to opening 35. Both indexes may be placed upon the vertically movable scale member 36 and rotation of carrier 22 translated into movement of member 36 in any suitable manner so as to position the desired scale in reading position.

The example given here shows an elliptical yoke 37 carried by the upper end of member 36, the end of shaft 25 being provided with a crank 38 cooperating with the yoke to move member 36. Since readings obtained through collector 23 and transmitting grid 24 are of a different order, a scale indicating the appropriate factors is thus made available automatically.

Suitable calculating dials 39 whereby such readings are readily translated into apertures, time of exposure, etc. for emulsions of different characteristics may be carried on the rear wall 12.

In order to permit rapid evaluation of light values both in high key light and in low key light without the use of separate masks as hereinbefore described, the carrier 22 may be provided with two light-collecting members 23 and two light-transmitting members 24, one of each pair being provided with a built-in mask. This type of device can be more readily employed under all conditions and may either have four indexes on the scale 36 or only two indexes; in the latter case the shape of yoke 37 is modified so as to move a given scale in position when any one of the light-collecting members is used.

There has thus been provided a compact and highly efficient exposure meter which is capable of being quickly and readily changed so that it may be set up to read light values of either incident light or reflected light affecting an object to be photographed.

I claim:

1. In an exposure meter including a housing, a photo-electric cell in the housing and a device for indicating the response of the cell to light, the combination of: a carrier turret pivotally mounted on the exposure meter, said turret being provided with a translucent light-collecting member and a light-transmitting portion, said collecting member and light-transmitting portion being selectively movable into operative relation with the photo-electric cell, and a plurality of scales for the response-indicating device, a correlated scale from said plurality of scales being automatically moved into desired cooperation with the indicating device upon selective movement of the carrier turret.

2. In an exposure meter including a housing, a photo-electric cell in the housing and a device for indicating the response of the cell to light, the combination of: a carrier turret pivotally mounted on the exposure meter, said turret being provided with a translucent light-collecting member and a light-transmitting portion, said collecting member and light-transmitting portion being selectively movable into operative relation with the photo-electric cell; a movable scale member having two series of indices, and means for automatically moving said scale member in timed relation to the movement of said carrier.

3. An exposure meter comprising: a housing having a record-reading aperture therein, a light-admitting aperture therein, a light-responsive element in the housing including a light-sensitive portion positioned within said light-admitting aperture, a carrier turret movably mounted on the housing having an aperture in one portion thereof and a light-collecting element surrounding the aperture adapted to collect light and adapted to be positioned over the light-admitting aperture, said carrier turret having an alternative light-collecting element independent of the first light-collecting element for passing light to the housing and adapted alternatively to be positioned over the light-admitting aperture, and a movable recording element associated respectively with the light-collecting elements having positions within the record-reading aperture corresponding to the respective positions of the carrier turret.

4. An exposure meter comprising: a housing having a record-reading aperture therein, a light-responsive element in the housing including indicating means movable within the area covered by the record-reading aperture, said housing having a light-admitting aperture, a light-sensitive portion of the light-responsive element being positioned within said last aperture, a carrier turret movably mounted on the housing having an aperture in one portion thereof and a light-collecting element surrounding the aperture adapted to collect incident light and adapted to be positioned over the light-admitting aperture, said turret having another aperture therein for receiving reflected light and adapted alternatively to be positioned over the light-admitting aperture, and a scale element connected to the turret and movable in conjunction therewith to positions adjacent the pointer corresponding to the respective positions of the turret.

5. An exposure meter comprising: a housing having a record-reading aperture therein, a light-responsive element in the housing including indicating means movable within the area covered by the recording aperture, said housing having a light-admitting aperture, a light-sensitive portion of the light-responsive element being positioned within said last aperture, a carrier turret comprising a movable element having a correspondingly movable support extending into the housing and supporting said member on the housing, one portion of said movable element having an aperture therein and a spherically curved light-collecting element surrounding the aperture adapted to collect incident light and adapted to be positioned over the light-admitting aperture, another portion of said movable element having a series of apertures therein for receiving reflected light and adapted alternatively to be positioned over the light-admitting aperture, and a pair of scales connected to the movable support and respectively movable thereby to a position adjacent the pointer, one of said scales having a position adjacent the needle when the spherically curved collector is passing light to the housing and the other scale having position adjacent the needle when the receiver of reflected light is passing light to the housing.

6. A compound exposure meter comprising: a housing having side, front and back walls, one of said walls having an aperture therein, a light-responsive element in the housing including means movable within the area covered by said aperture, another of said walls having an aperture therein, a light-sensitive portion of the light-responsive element being positioned within said other aperture, a carrier turret comprising a movable element having a correspondingly movable support extending into the housing and supporting said member on the housing, on end of said movable element having an aperture therein and a semi-spherical light-collecting element surrounding the aperture adapted to collect incident light and adapted to be positioned over the aperture containing the light-responsive element, the other end of said movable element having a series of apertures therein for receiving reflected light and adapted alternatively to be positioned over the aperture in said other wall, and a pair of scales connected to the movable support and respectively movable thereby to a position adjacent the pointer, one of said scales having a position adjacent the needle when the semi-spherical collector is passing light to the housing and the other scale having position adjacent the needle when the receiver of reflected light is passing light to the housing.

7. A compound exposure meter comprising: a housing having sides, front and back, said back having an aperture therein, a light-responsive element in the housing including an indicating means movable within the area covered by the back aperture, said front having an aperture therein, a light-sensitive portion of the light-responsive element being positioned within said front aperture, a carrier turret comprising a rotatable element having a shaft extending into the housing and supporting said member in rotatable position on the front of the housing, one end of said movable element having an aperture therein and a semi-spherical light-collecting element surrounding the aperture adapted to collect incident light and adapted to be positioned over the front aperture, the other end of said movable element having a series of apertures therein for receiving reflected light and adapted alternatively to be positioned over the front aperture, and a pair of scales connected to the shaft and respectively movable thereby to a position adjacent the pointer, one of said scales having a position adjacent the needle when the semi-spherical collector is passing light to the housing and the other scale having position adjacent the needle when the receiver of reflected light is passing light to the housing.

8. In an exposure meter: a housing provided with a port therein and a light-sensitive cell beneath said port, a carrier turret mounted on said housing, the turret being provided with a translucent light-collecting member and a light-transmitting portion, said turret being movable to bring said member and portion selectively into operative relation with said port and cell, a device including an index for indicating the response of the cell to light, within the housing, a scale including different series of indices, and means for automatically shifting the scales when the carrier turret is moved to place a desired series of indices in operative relation to the index of the response indicating device.

9. In an exposure meter including a housing, a port therein and a light-sensitive cell therebelow, a response indicating device associated with said cell, said device having an index, the combination of: a turret movably attached to said housing, said turret being provided with a light-transmitting portion and a light-collecting member, the turret being movable to bring said member and portion selectively into alignment and operative relation with the port and cell; a pair of scales, one being correlated to response through the light-transmitting portion and one correlated to response through the light-collecting member; and means, actuated by the movement of the turret, for bringing an appropriate scale into visually correlatable relation with the index of the response indicating device while the other scale is obscured.

GERTRUDE E. FREUND.